United States Patent
Shaffer et al.

(10) Patent No.: US 7,827,419 B2
(45) Date of Patent: Nov. 2, 2010

(54) APPARATUS AND METHOD FOR CENTRALIZED POWER MANAGEMENT

(75) Inventors: Shmuel Shaffer, Palo Alto, CA (US); Robert E. Gleichauf, San Antonio, TX (US)

(73) Assignee: Cisco Technology, Inc., San Jose, CA (US)

( * ) Notice: Subject to any disclaimer, the term of this patent is extended or adjusted under 35 U.S.C. 154(b) by 863 days.

(21) Appl. No.: 11/555,885

(22) Filed: Nov. 2, 2006

(65) Prior Publication Data

US 2007/0058453 A1 Mar. 15, 2007

Related U.S. Application Data

(62) Division of application No. 09/947,081, filed on Aug. 29, 2001, now Pat. No. 7,188,260.

(51) Int. Cl.
*G06F 1/26* (2006.01)
*G06F 1/32* (2006.01)

(52) U.S. Cl. .............. 713/300; 713/310; 713/320; 713/324; 700/286; 700/291; 705/412

(58) Field of Classification Search ............... 713/300, 713/310, 320–324, 330, 340; 705/412; 700/286, 700/291
See application file for complete search history.

(56) References Cited

U.S. PATENT DOCUMENTS

| | | | |
|---|---|---|---|
| 5,557,557 A * | 9/1996 | Frantz et al. .............. 703/22 |
| 6,269,343 B1 | 7/2001 | Pallakoff ................... 705/26 |
| 6,415,270 B1 | 7/2002 | Rackson et al. ........... 705/36 R |
| 6,529,839 B1 * | 3/2003 | Uggerud et al. .............. 702/61 |
| 6,609,208 B1 * | 8/2003 | Farkas et al. ................ 713/320 |
| 6,618,709 B1 | 9/2003 | Sneeringer ................. 705/412 |
| 6,625,737 B1 * | 9/2003 | Kissell ....................... 713/300 |
| 6,681,156 B1 | 1/2004 | Weiss ........................ 700/291 |
| 6,785,592 B1 | 8/2004 | Smith et al. ................. 700/291 |
| 7,062,361 B1 * | 6/2006 | Lane .......................... 700/295 |
| 7,111,177 B1 * | 9/2006 | Chauvel et al. ............ 713/300 |
| 7,143,204 B1 * | 11/2006 | Kao et al. ..................... 710/18 |
| 7,171,374 B1 * | 1/2007 | Sheehan et al. .............. 705/8 |
| 2002/0087901 A1 * | 7/2002 | Cooper et al. ............... 713/320 |
| 2004/0024483 A1 * | 2/2004 | Holcombe .................. 700/122 |

OTHER PUBLICATIONS

"Cisco Long-Reach Ethernet Technology" White Paper, *Cisco Systems, Inc.*, 2001, 8 pages, 2001.
"Cisco Long-Reach Ethernet Solution" Product Catalog, *Cisco Systems, Inc.*, Aug. 2001, 6 pages.

* cited by examiner

*Primary Examiner*—Thomas Lee
*Assistant Examiner*—Fahmida Rahman
(74) *Attorney, Agent, or Firm*—Baker Botts L.L.P.

(57) ABSTRACT

The invention describes a system and method for arranging to provide power to a power monitor device. The disclosure describes the system and method receiving a request for power for at least one device specified by a power monitor device. The disclosure describes receiving at least one proposal from an entity desiring to supply power according to the request for power. A best proposal of the at least one proposal is determined. And the system and method command the power monitor device to supply power in accordance with the best proposal.

18 Claims, 9 Drawing Sheets

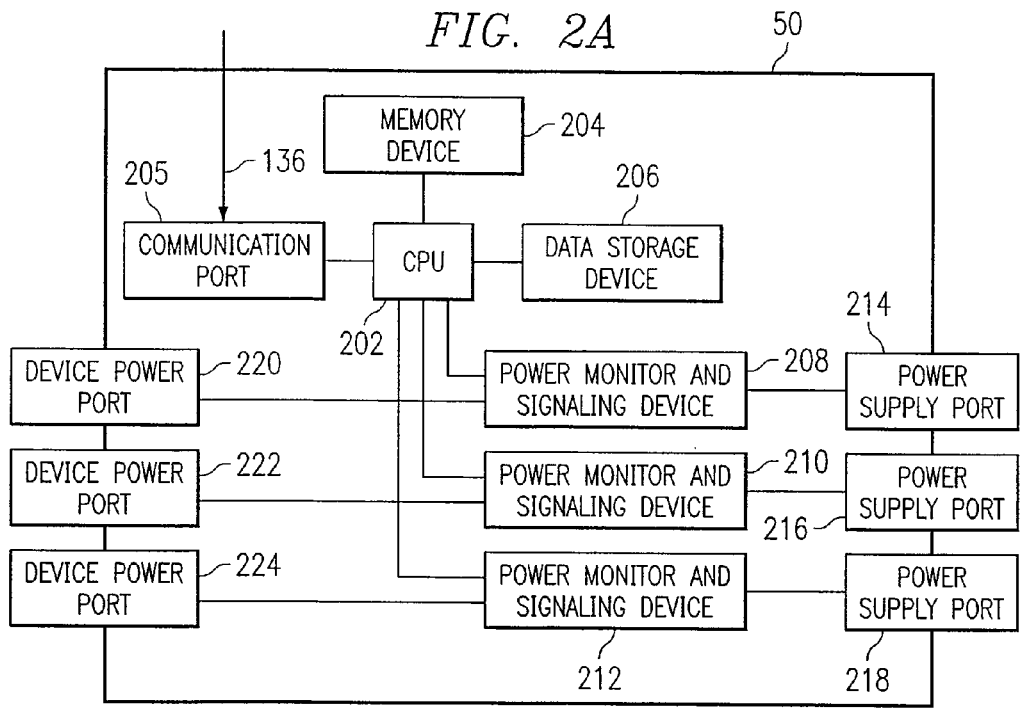
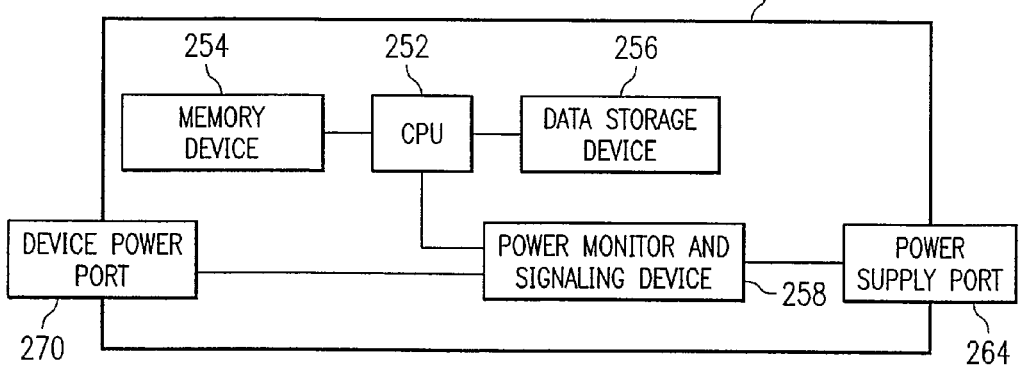

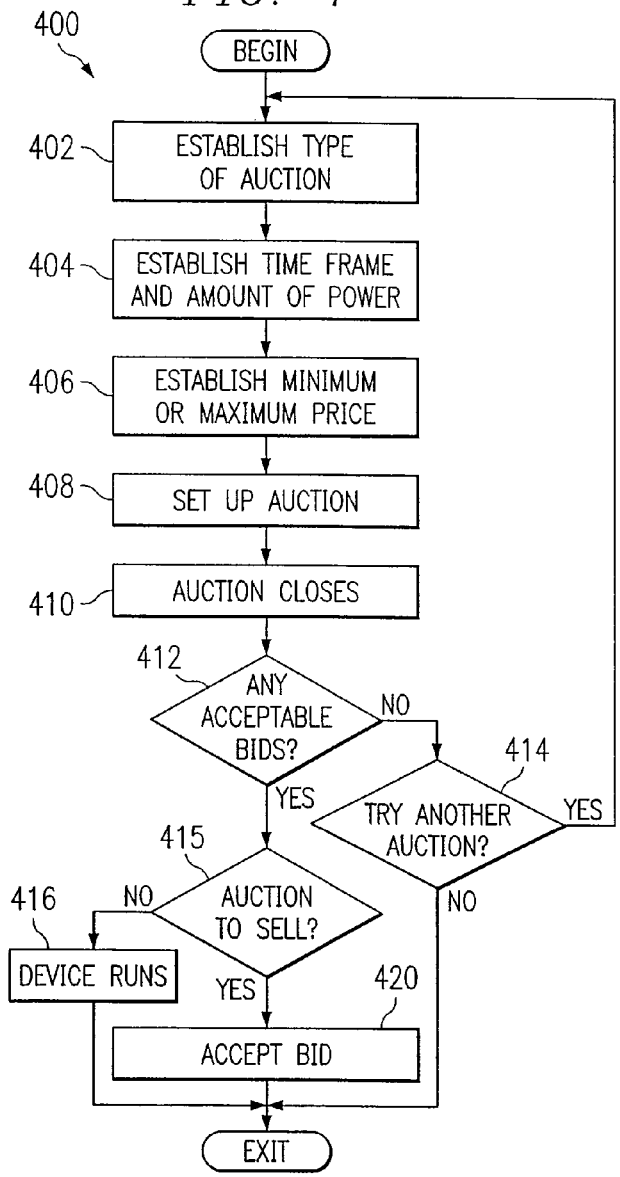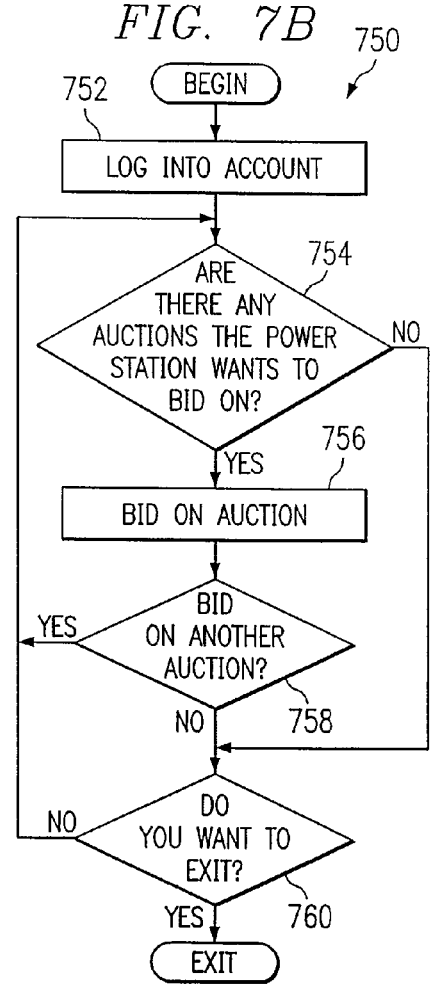

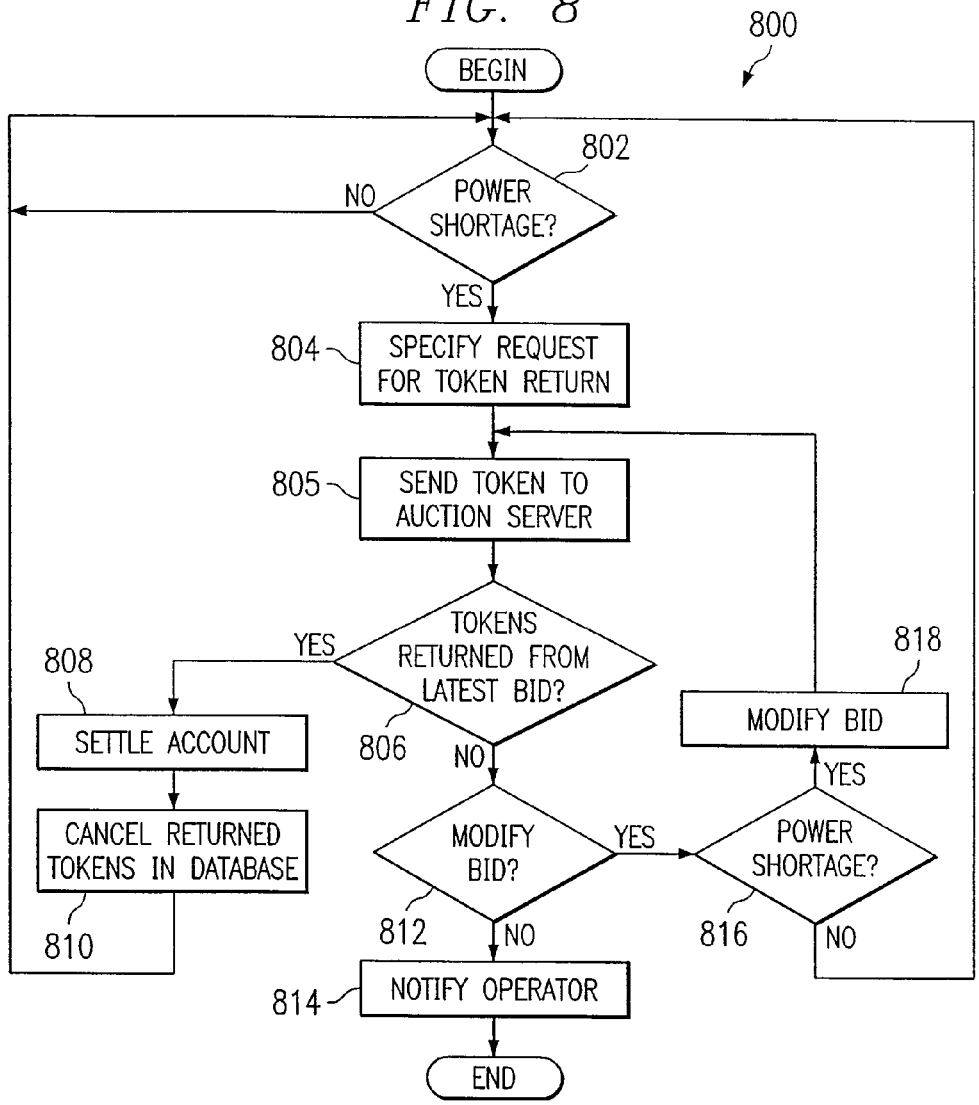

APPARATUS AND METHOD FOR CENTRALIZED POWER MANAGEMENT

CROSS-REFERENCE TO RELATED APPLICATION

This application is a divisional of U.S. application Ser. No. 09/947,081 filed Aug. 29, 2001 and entitled "Apparatus and Method for Centralized Power Management".

TECHNICAL FIELD OF THE INVENTION

This invention relates in general to power consumption, and more particularly to management of power consumption.

BACKGROUND OF THE INVENTION

In order to conserve energy and alleviate power shortages at certain times of the day, it is advantageous to encourage consumers to make use of power at non-peak hours of the day, thus causing power consumption to become more uniform throughout the day. Traditionally, electrical devices have been activated whenever a user needs a function performed by the electrical device. For example, if a wash needs to be done, the user of the washing machine loads the washing machine and does the wash. The power usage aspect of doing the wash is not generally considered. Traditionally, a power network distributes its power through power lines. These power lines eventually terminate in power meters, which measure the amount of power that flows through them. Power is drawn through power meters by electrical devices that consume power when they operate.

SUMMARY OF THE INVENTION

In accordance with the present invention, the disadvantages and problems associated with management of power consumption have been substantially reduced or eliminated. In particular, the present invention provides a system that will provide the power customer with an inducement to distribute the customer's power consumption more evenly throughout the day.

In accordance with one embodiment of the present invention, a method for arranging to provide power to a customer is provided. An aspect of the invention includes receiving a request for power for at least one device specified by a customer, receiving at least one proposal from an entity desiring to supply power according to the request for power, determining a best proposal of the at least one proposal, and commanding a power monitor device associated with the customer to supply power in accordance with the best proposal.

Another aspect of this invention includes a power monitor device for monitoring power consumption. The power monitor device includes a group of first electrical ports, each of the first electrical ports is configured to receive power, a group of second electrical ports, each of the second electrical ports configured to supply power, and a communications port configured to communicate via a communications network. The communications port also communicates with a processor. The processor includes a data storage element, and the processor is connected to the communications port and at least one signaling device. The processor is configured to receive commands from the communications port, to transmit data to the communications port, and to transmit commands to the at least one signaling device. Each of the at least one signaling device is connected to an associated one of the plurality of first electrical ports, an associated one of the plurality of second electrical ports, and the processor. Each of the at least one signaling device is configured to create a power profile, to transmit commands to at least one electrical outlet, and to transmit the power profile to the processor.

Important technical advantages of certain embodiments of the present invention include redistributing the timing of power consumption and thus alleviating potential power crises, providing an automatic system for users to bid for lower cost power, and providing an automatic system for power companies to sell power during low power consumption periods.

Other technical advantages will be readily apparent to one skilled in the art from the following figures, descriptions and claims.

BRIEF DESCRIPTION OF THE DRAWINGS

For a more complete understanding of the present invention and its advantages, reference is now made to the following description, taken in conjunction with the accompanying drawings, in which:

FIG. 2A is a block diagram illustrating a direct communication power monitor device in accordance with the present invention;

FIG. 2B is a block diagram illustrating an indirect communication power monitor device in accordance with the present invention;

FIG. 4 is a flow chart illustrating a process of purchasing and using power through a power auction in accordance with the present invention;

FIG. 7B is a flow chart illustrating a process for bidding on power auctions in accordance with the present invention; and FIG. 8 is a flow chart illustrating a process for reducing the amount of power consumption during a power shortage in accordance with the present invention.

Figure 1A:
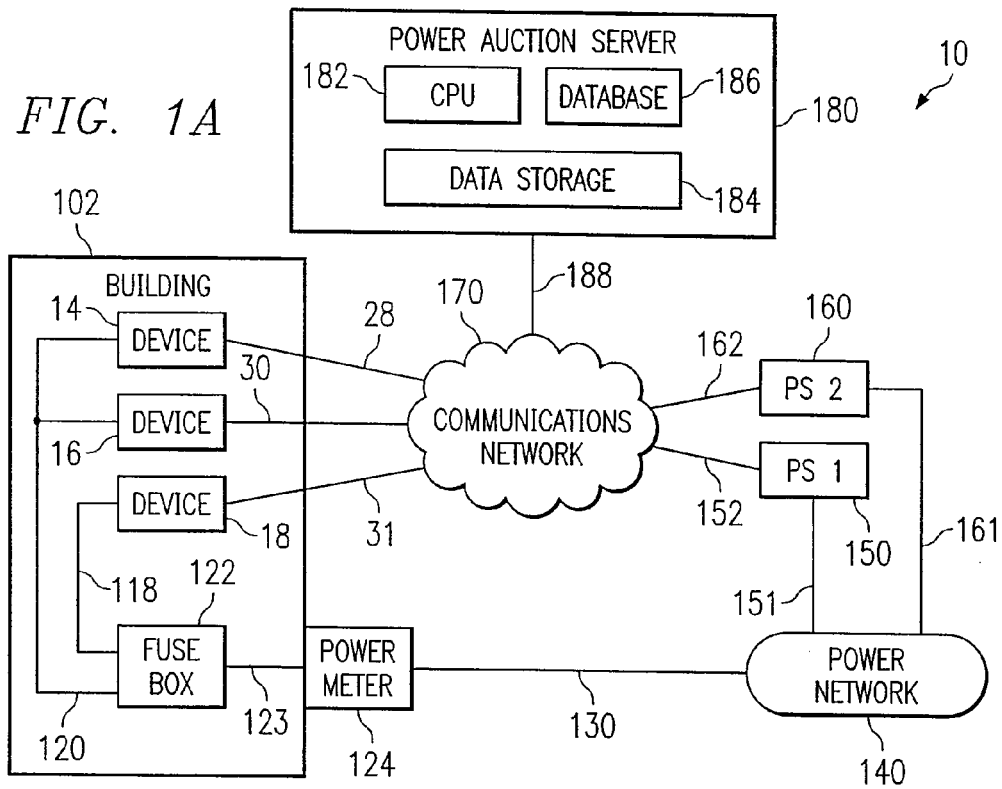
FIG. 1A is a block diagram illustrating a power control system for managing power consumption and purchasing power at a reduced rate.

Throughout the figures, unless otherwise stated, the same reference numerals and characters are used to denote like features, elements, components, or portions of the illustrated embodiments. Moreover, while the subject invention will now be described in detail with reference to the figures, and in connection with the illustrative embodiments, changes and modifications can be made to the described embodiments without departing from the true scope and spirit of the subject invention as defined by the appended claims.

DETAILED DESCRIPTION OF THE INVENTION

FIG. 1A illustrates a power control system 10 for managing power consumption and purchasing power at a reduced rate. A building 102 including a device 14, a device 16, a device 18, a power supply circuit 118, a power supply circuit 120, a fuse box 122, a fuse box power supply line 123, a power meter 124, a power supply line 130, and a group of communications network connections 28, 30, 31 is provided. A communications network 170, a power network 140, a power station 150, including a power production line 151 and a power station communications network connection 152 and a power station 160, including a power production line 161 and a power station communications network connection 162 are also provided. The communications network 170 can be, for example, the Internet.

The power station 150 and the power station 160 supply power to the power network 140 through the power production lines 151, 161 respectively. The power stations 150, 160 communicate with the communications network 170 through the power station communications network connections 152, 162 respectively. The power network 140 supplies the power meter 124 with power through the power supply line 130. The power meter 124 measures the energy flowing through it to the devices within the building 102. In an alternate embodiment, the power meter 124 can be used to measure the energy being used by the devices located in a group of buildings. The power meter 124 supplies power to the fuse box 122 through the fuse box power supply line 123. The fuse box 122 supplies power to the power supply circuits 118, 120. The power supply circuit 118 supplies power to the device 18, which is also connected to the communications network 170 through the communications network connection 31. The power supply circuit 120 supplies power to the devices 14, 16, which are connected to the communications network 170 through the communications network connections 28, 30, respectively. The devices 14, 16, 18 can be any electrical device, including, but not limited to: washing machines, dryers, dish washers, printing presses, manufacturing presses, computers, telephones, lamps, air conditioners, water heaters, heating systems, and the like.

Each of the devices 14, 16, 18 includes a direct communication power monitor device 50, shown in FIG. 2A, that communicates with the communications network 170 through each of the communications network connections 28, 30, 31, respectively. The direct communication power monitor device 50 of each of the devices 14, 16, 18 can be configured to set up auctions to purchase and sell power on a power auction server 180 by sending the power auction server 180 parameterized tokens. Each of the devices 14, 16, 18 are configured to supply the associated direct communication power monitor device 50 with the appropriate information to set up auctions to purchase and sell power.

Parameterized tokens can be formatted network messages. The parameterized token may contain a digital certificate and parameters. A device that receives the parameterized token can verify the validity of the parameterized token by analyzing the digital certificate in association with the parameters of the parameterized token. If any portion of the digital certificate or parameters has been altered the device can detect the change and reject the parameterized token. The parameters of the parameterized token can include, among others, a power class, a start time, a latest start time, an end time, an active time, a power amount, a maximum rate, a minimum rate, and a priority value.

In a certain embodiment, the tokens utilize public-private key techniques to encrypt and authenticate the tokens.

The power auction server 180 includes a central processing unit 182, a data storage unit 184, a database 186 and a power auction server communications network connection 188. Auctions for power are conducted on the power auction server 180. Power monitor devices and power stations set up and bid on power auctions on the power auction server 180. The information describing the power station accounts and the monitor device accounts are stored on the data storage unit 184, and the details about the power auctions are stored on the database 186. In a certain embodiment, the data storage unit 184 can be eliminated, and the database 186 may contain the information describing the power station accounts, the information describing the monitor device accounts, and the details about the power auctions.

In a certain embodiment, the power auction server 180 can be eliminated, and the functionality of the power auction server 180 can be embedded in the power stations 150, 160 and the direct communication power monitor device 50. The devices 14, 16, 18 send messages to set up and bid on auctions directly to the power stations 150, 160, and the power stations 150, 160 send messages directly to the devices 14, 16, 18.

In a certain embodiment, the direct communication power monitor device 50 of each of the devices 14, 16, 18 is configured to set up auctions to purchase and sell power with any device connected to the communications network 170. In a certain embodiment, a computer may act as a proxy for the direct power monitor devices 14, 16, 18.

Figure 1B:
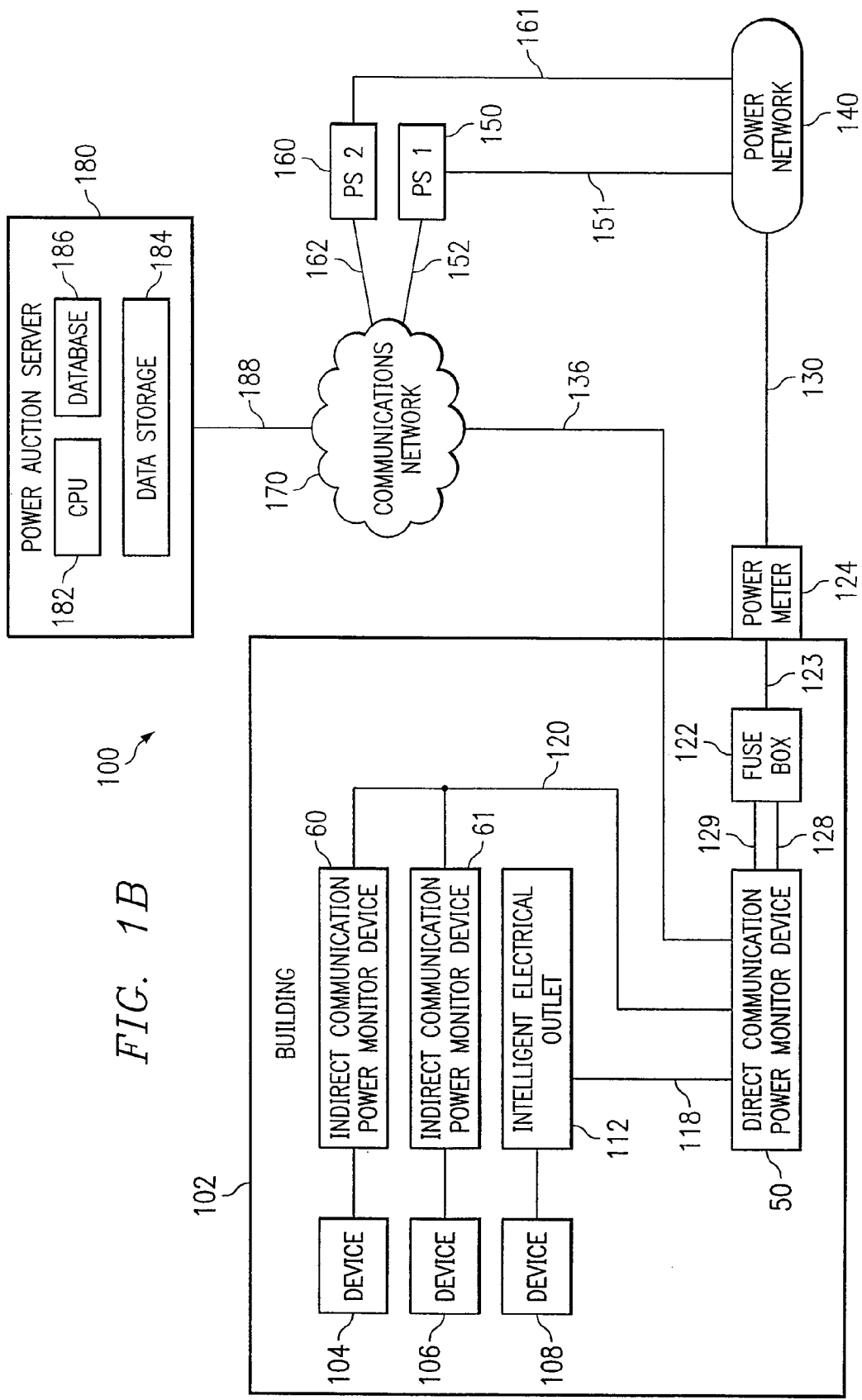
FIG. 1B is a block diagram illustrating a power control system for managing power consumption and purchasing power at a reduced rate.

FIG. 1B illustrates a power control system 100 for controlling the power distribution in a building or across a group of power supply circuits. The building 102 includes a device 104, a device 106, a device 108, a group of indirect power monitor devices 60, 61, an intelligent electrical outlet 112, the power supply circuit 118, the power supply circuit 120, the direct communication power monitor device 50, the fuse box circuit 128, the fuse box circuit 129, the fuse box 122, the fuse box power supply line 123, the power meter 124, the power supply line 130, and a power control communications network connection 136. Also provided are the communications network 170, the power network 140, the power station 150, including the power production line 151 and the power station communications network connection 152 and the power station 160, including the power production line 161 and the power station communications network connection 162.

The power station 150 and the power station 160 supply power to the power network 140 through the power production lines 151, 161 respectively. The power stations 150, 160 communicate with the communications network 170 through the power station communications network connections 152, 162 respectively. The power network 140 supplies the power meter 124 with power through the power supply line 130. The power meter 124 measures the energy flowing through it to the devices within the building 102. In an alternate embodiment, the power meter 124 can be used to measure the energy being used by the devices located in a group of buildings. The power meter 124 supplies power to the fuse box 122 through the fuse box power supply line 123. The fuse box 122 supplies power to the fuse box circuits 128, 129. The direct communication power monitor device 50 receives power from the fuse box circuits 128, 129 and supplies that power to the power supply circuits 118, 120, respectively. The direct communication power monitor device 50 is connected to the communications network 170 through the power monitor device communications network connection 136. The direct communication power monitor device 50 is shown in more detail in FIG. 2A and further described below. The power supply circuit 120, shown in FIG. 1B, supplies power to the indirect power monitor devices 60, 61, which in turn supply power to the devices 104, 106. The power supply circuit 118 supplies power to the intelligent electrical outlet 112, which in turn supplies power to the device 108. The intelligent electrical outlet 112 contains the indirect power monitor device 60. The indirect communication power monitor devices 60, 61 can, and typically will, be substantially identical. The indirect communication power monitor device 60 is shown in detail in FIG. 2B and further described below. The power supply circuits 118, 120 are used to transmit the parameterized tokens between the device 50, and the devices 60, 61, 112.

In a certain embodiment, the intelligent electrical outlet 112 is configured to provide power to a device plugged into the intelligent electrical outlet if the intelligent electrical outlet receives a command to supply power, or refrain from providing power to the device plugged into the intelligent electrical outlet if the intelligent electrical outlet receives a command to stop supplying power.

The power auction server 180, shown in FIG. 1B, includes the central processing unit 182, the data storage unit 184, the database 186 and the power auction server communications network connection 188. Auctions for power are conducted on the power auction server 180. Power monitor devices and power stations set up and bid on power auctions on the power auction server 180. The information describing the power station accounts and the monitor device accounts are stored on the data storage unit 184, and the details about the power auctions are stored on the database 186. In another certain embodiment, the data storage unit 184 can be eliminated, and the database 186 may contain the information describing the power station accounts, the information describing the monitor device accounts, and the details about the power auctions.

In a certain embodiment, the power auction server 180 can be eliminated, and the functionality of the power auction server 180 can be embedded in the power stations 150, 160, the direct communication power monitor device 50 sends messages directly to the power stations 150, 160, and the power stations 150, 160 send messages directly to the direct communication power monitor device 50. In another certain embodiment, the messages are parameterized tokens.

In a certain embodiment, the direct communication power monitor device 50 is configured to set up auctions to purchase and sell power with any device connected to the communications network 170. In another certain embodiment, the direct communication power monitor device 50 is configured to set up auctions to purchase and sell power on the power control server 180.

Figure 1C:
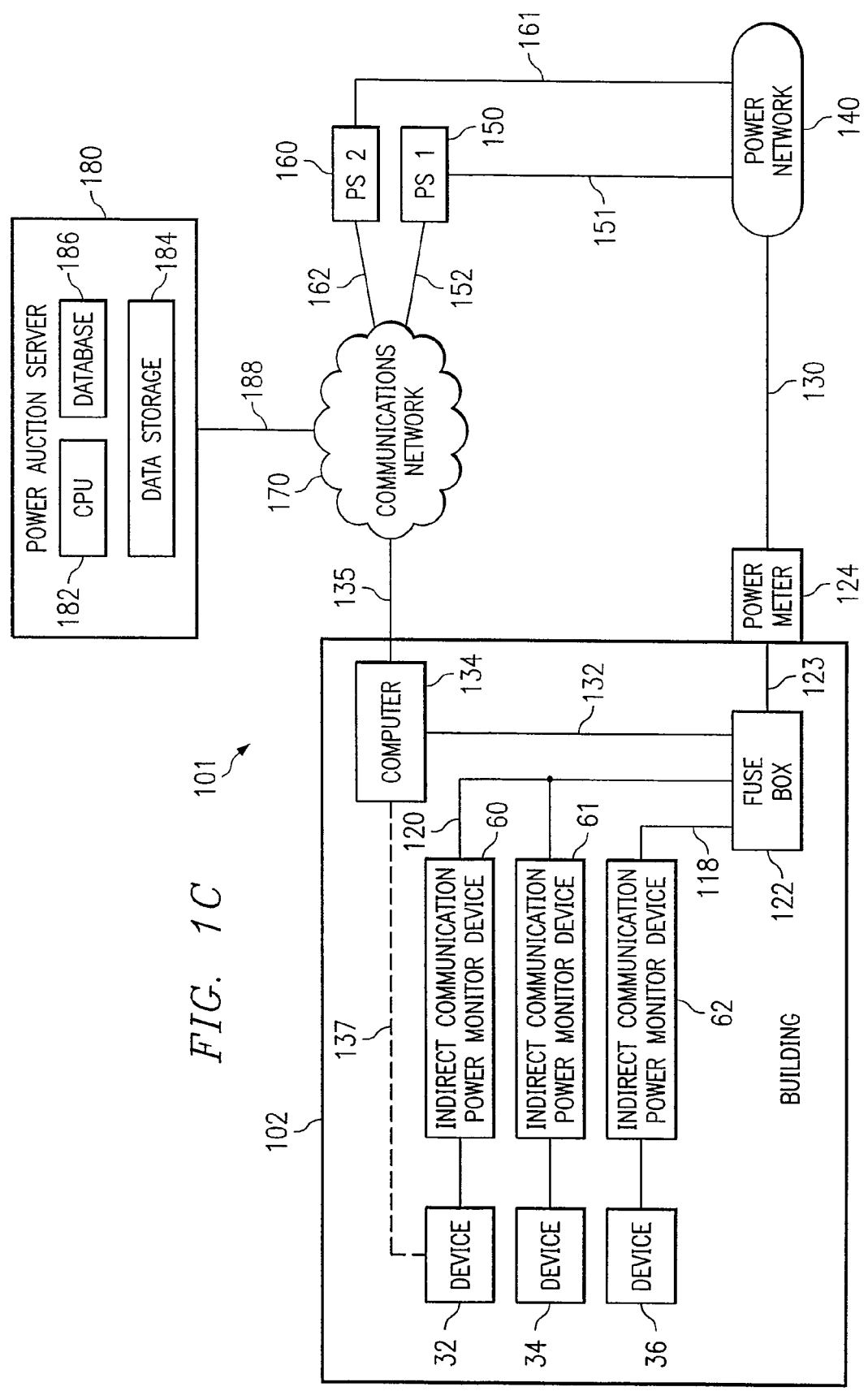
FIG. 1C is a block diagram illustrating a power control system for controlling the power distribution across a group of power supply circuits in accordance with the present invention.

FIG. 1C illustrates a power control system 101 for controlling the power distribution in a building or across a group of power supply circuits. Building 102 includes a device 104, a device 106, a device 108, the group of indirect power monitor devices 60, 61, 62, the power supply circuit 118, the power supply circuit 120, the fuse box 122, the fuse box power supply line 123, the power meter 124, the power supply line 130, a power supply circuit 132, a computer 134, and a computer communications network connection 135. Also provided are the communications network 170, the power network 140, the power station 150, including the power production line 151 and the power station communications network connection 152 and the power station 160, including the power production line 161 and the power station communications network connection 162.

The power station 150 and the power station 160 supply power to the power network 140 through the power production lines 151, 161 respectively. The power stations 150, 160 communicate with the communications network 170 through the power station communications network connections 152, 162 respectively. The power network 140 supplies the power meter 124 with power through the power supply line 130. The power meter 124 measures the energy flowing through it to the devices within the building 102. In an alternate embodiment, the power meter 124 can be used to measure the energy being used by the devices located in a group of buildings. The power meter 124 supplies power to the fuse box 122 through the fuse box power supply line 123. The fuse box 122 supplies power to the power supply circuits 118, 120. The power supply circuit 120 supplies power to the indirect power monitor devices 60, 61, which in turn supply power to the devices 32, 34. The power supply circuit 118 supplies power to the indirect power monitor device 62, which in turn supplies power to the device 36. The indirect communication power monitor devices 60, 61, 62 can be and typically are substantially identical. The indirect communication power monitor device 60 is shown in detail in FIG. 2B and described more fully below. The power supply circuit 132 in FIG. 1C supplies power to the computer 134, which is also connected to the communications network 170 through the computer communications network connection 135. The power supply circuits 118, 120, 132 are used to transmit the parameterized tokens between the computer 134, and the devices 60, 61, 62.

In an alternate embodiment, the computer 134 may be directly connected to the device 32 by a communications link 137, shown by the dashed line, if the device 32 contains a direct communication power monitor device 50. In this case, the indirect communication monitor device 60 may be eliminated.

The power auction server 180 includes the central processing unit 182, the data storage unit 184, the database 186 and the power auction server communications network connection 188. Auctions for power are conducted on the power auction server 180. Power monitor devices and power stations set up and bid on power auctions on the power auction server 180. The information describing the power station accounts and the monitor device accounts are stored on the data storage unit 184, and the details about the power auctions are stored on the database 186.

In a certain embodiment, the power auction server 180 can be eliminated and the functionality of the power auction server 180 can be embedded in the power stations 150, 160 and the computer 134. The computer 134 sends messages directly to the power stations 150, 160, and the power stations 150, 160 send messages directly to the computer 134. In another certain embodiment, the messages are parameterized tokens. In yet another certain embodiment, the data storage unit 184 can be eliminated, and the database 186 may contain the information describing the power station accounts, the information describing the monitor device accounts, and the details about the power auctions.

In a certain embodiment, the computer 134 acts as a proxy for the indirect power monitor devices 60, 61, 62. In a certain embodiment, the computer 134 is configured to set up auctions to purchase and sell power with any device connected to the communications network 170. In another certain embodiment, the computer 134 is configured to set up auctions to purchase and sell power on the power auction server 180.

FIG. 2A illustrates the direct communication power monitor device 50 in greater detail. The direct communication power monitor device 50 includes a central processing unit 202, a memory device 204, a communications port 205, a data storage unit 206, a group of power monitor, signaling and switching devices 208, 210, 212, a group of power supply ports 214, 216, 218, and a group of device power ports 220, 222, 224. The power supply ports 214, 216, 218 are connected to the device power ports 220, 222, 224, respectively, through the power monitor, signaling and switching devices 208, 210, 212, respectively. There can be any number of power supply ports, device power ports and power monitor, signaling and switching devices. In a certain embodiment, the number of power supply ports, device power ports and power monitor, signaling and switching devices is equal. The power monitor, signaling and switching devices 208, 210, 212 are controlled by the central processing unit 202. The central processing unit 202 receives commands from the communications network 170 through the communications port 205. The communications port 205 is connected to the communications network 170 by the power control communications network connection 136. The power monitor, signaling and switching devices 208, 210, 212 are configured to send parameterized tokens to devices or electrical outlets connected to one of the device power ports 220, 222, 224 or the power supply ports 214, 216, 218, receive parameterized tokens from devices or electrical outlets connected to one of the device power ports 220, 222, 224 or the power supply ports 214, 216, 218, supply power to devices or electrical outlets connected to one of the device power ports 220, 222, 224, stop supplying power to devices or electrical outlets connected to one of the device power ports 220, 222, 224, and monitor the amount of power supplied to devices or electrical outlets connected to one of the device power ports 220, 222, 224. In a certain embodiment, the power monitor, signaling and switching devices 208, 210, 212 send and receive parameterized tokens using Long Range Ethernet which was developed by Cisco System Inc., 170 West Tasman Drive, San Jose, Calif. 95134-1619. A unit identifier is stored in the memory device 204 of the power monitor device.

In a certain embodiment, the direct communication power monitor device 50 can be implemented on an ASIC, a general purpose processor, a micro-processor, a programmable logic device, or a field programmable gate array, among others. In another certain embodiment the power monitor, signaling and switching devices 208, 210, 212 are configured to act as on-off switches.

FIG. 2B illustrates the indirect communication power monitor device 60 in greater detail. The indirect communication power monitor device 60 includes a central processing unit 252, a memory device 254, a data storage unit 256, a power monitor, signaling and switching device 258, a power supply port 264, and a device power port 270. The power supply port 264 is connected to the device power port 270 through the power monitor, signaling and switching device 258. There can be any number of power supply ports, device power ports and power monitor, signaling and switching devices. In a certain embodiment, the number of power supply ports, device power ports and power monitor, signaling and switching devices is equal. The power monitor, signaling and switching device 258 is controlled by the central processing unit 252. The power monitor, signaling and switching device 258 is configured to send parameterized tokens to devices or electrical outlets connected to one of the device power port 270 or the power supply port 264, receive parameterized tokens from devices or electrical outlets connected to one of the device power port 270 or the power supply port 264, supply power to devices or electrical outlets connected to one of the device power port 270 or the power supply port 264, and stop supplying power to devices or electrical outlets connected to one of the device power port 270 or the power supply port 264. In a certain embodiment, the power monitor, signaling and switching device 258 sends and receives parameterized tokens using Long Range Ethernet which was developed by Cisco System Inc., 170 West Tasman Drive, San Jose, Calif. 95134-1619. A unit identifier is stored in the memory device 254 of the power monitor device. The main structural difference between the direct communication power monitor device 50 and the indirect communication power monitor device 60 is that the direct communication power monitor device 50 has the communications port 205 and the power monitor communications network connection 136, whereas the indirect communication power monitor device 60 does not. Therefore, the direct communication power monitor device 50 can communicate with other devices through the communication port 205 or through the device power ports 220, 222, 224 or the power supply ports 214, 216, 218, while the indirect communication power monitor device 60 may only communicate with other devices through the device power port 270 or the power supply port 264.

In a certain embodiment, the indirect communication power monitor device 60 can be implemented on an ASIC, a general purpose processor, a micro-processor, a programmable logic device, or a field programmable gate array, among others. In another certain embodiment, the indirect communication power monitor devices 60 can be nested together, thus providing many levels of device control. In another certain embodiment the power monitor, signaling and switching device 258 is configured to act as on-off switches.

Figure 3:
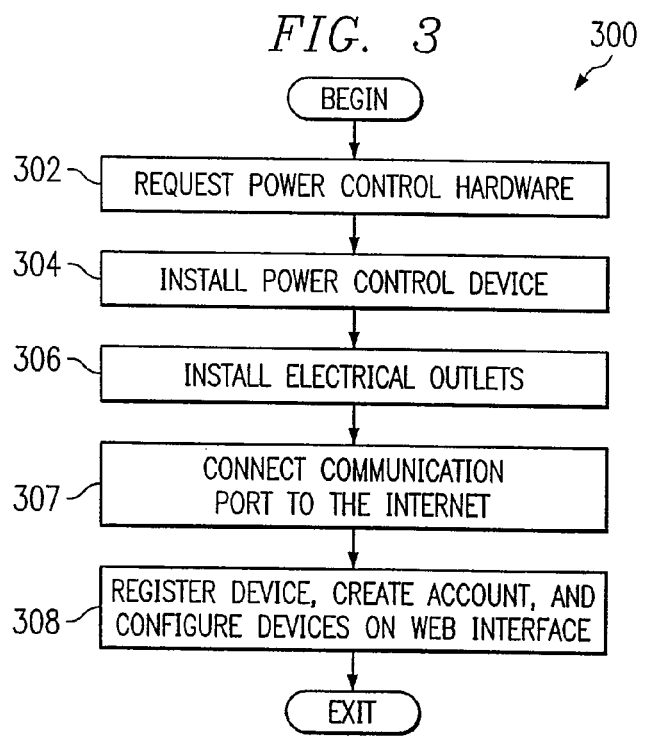
FIG. 3 is a flow chart illustrating a process of installing the direct communication power monitor device in accordance with the present invention.

FIG. 3 illustrates the process 300 of installing a power monitor device that does not exist within a device. A customer requests the power monitor device, either a direct communication power monitor device 50 or the indirect communication power monitor device 60, from a vendor at step 302. The power monitor device is physically installed at step 304. The power monitor device can be physically installed in an electrical circuit. For example, the direct communication power monitor device 50 of FIG. 1B can be physically installed between the fuse box and the power supply circuits. The power supply circuits are severed into the fuse box circuits 128, 129 and the power supply circuits 118, 120, shown in FIG. 1B. As shown in conjunction with FIG. 2A, the fuse box circuits 128, 129 are connected to the power supply ports 216, 218, and the power supply circuits 118, 120 are connected to the device power ports 222, 224.

Returning to FIG. 3, the building 102 is fitted with intelligent electrical outlets at step 306. The power monitoring and signal devices located within the direct communication power monitor device 50 or the indirect communication power monitor device 60 can turn an intelligent electrical outlet on or off through the power supply circuits. Turning an intelligent electrical outlet on will allow a device which is plugged into the intelligent electrical outlet, to draw power through the intelligent electrical outlet. If an intelligent electrical outlet is off, no power can be drawn through it. In a certain embodiment, the functionality of the intelligent electrical outlets is embedded within a device.

In a certain embodiment, the power monitor device controls a group of devices where some of the group of devices include the indirect communication power monitor device 60 or the direct communication power monitor device 50. For each of the devices that include the indirect communication power monitor device 60 or the direct communication power monitor device 50, the intelligent electrical outlets do not have to be installed, rather any type of electrical outlets can be used.

At step 307, if the power monitor device is the direct communication power monitor device 50, the communications port 205 of the direct communication power monitor device 50 is connected to the communications network 170. The physical cable linking the direct communication power monitor device 50 to the communications network 170 is connected to the communications port 205 of the direct communication power monitor device 50. The direct communication power monitor device 50 is then able to communicate with the communications network 170.

At step 308, the customer can register the direct communication power monitor devices 50 and the indirect communication power monitor device 60. To register the direct communication power monitor device 50, a unit identifier is stored in a non-volatile portion of the memory device 204 associated with the direct communication power monitor device 50 and is associated with an account of the direct communication power monitor device 50. To register the indirect communication power monitor device 60, a unit identifier is stored in a non-volatile portion of the memory device 254 associated with the indirect communication power monitor device 60 and is associated with an account of the indirect communication power monitor device 60. In a certain embodiment, the unit identifier of the indirect communication power monitor device 60 is stored in a volatile portion of the memory device 254 of the indirect communication power monitor device 60. In another certain embodiment, the unit identifier of the direct communication power monitor device 50 is stored in a volatile portion of the memory device 204 of the direct communication power monitor device 50.

For any system using an indirect communication power monitor device 60 there is at least one associated direct communication power monitor device 50. At this time, the customer may configure the direct communication power monitor devices 50 and the indirect communication power monitor devices 60 by specifying the devices that the direct communication power monitor devices 50 and the indirect communication power monitor devices 60 will be used with. For example, the indirect communication power monitor device 60 shown in FIG. 1B should be configured to be used in association with the device 104. In a certain embodiment, the geographical location of the direct communication power monitor devices 50 and the indirect communication power monitor devices 60 are provided. In another embodiment, the geographical locations of the devices 14, 16, 18, 32, 34, 36, 104, 106, 108 to be used with the direct communication power monitor devices 50 and the indirect communication power monitor devices 60 are provided. For each device 14, 16, 18, 32, 34, 36, 104, 106, 108 associated with the direct communication power monitor devices 50 and the indirect communication power monitor devices 60, the customer indicates a device name, the electrical outlet the device is connected to, and the device setting tuple. Each device setting tuple includes a device setting and a power profile for the device setting. The power profile indicates the amount of energy the device 14, 16, 18, 32, 34, 36, 104, 106, 108 uses over the execution of the associated device cycle. For example, to set up the device 108 shown in FIG. 1B, the customer would indicate that the customer wanted to set up the device 108, that the device 108 is connected to the intelligent electrical outlet 112, and that the device had a first device setting tuple and a second device setting tuple. In a certain embodiment, the device setting tuples are pre-programmed for each device. In another embodiment, the devices 14, 16, 18, 32, 34, 36, 104, 106, 108 to be used with the direct communication power monitor device 50 register themselves with the direct communication power monitor device 50. In another embodiment, the devices 32, 34, 36, 104, 106 to be used with the indirect communication power monitor device 60 register themselves with the indirect communication power monitor device 60. After step 308 is completed, the installation of the power monitor device is complete and the process 300 exits.

In an alternate embodiment, the device is set up by indicating information that may include the device make, the device model, the device year, and the electrical outlet the device is connected to. The power auction server 180 then consults with a database which contains the device setting tuples for devices of that device make. The device setting tuples for the indicated device make, the device model, and the device year are downloaded, completing the installation. In another alternate embodiment, the device setting tuples are stored in the data storage device 206 of the direct communication power monitor device 50.

FIG. 4 illustrates the process 400 of purchasing and using or selling power through a power auction. At step 402, the direct communication power monitor device 50 establishes the type of auction that will be set up. The direct communication power monitor device 50 can set up an auction to purchase or sell power. Once the direct communication power monitor device 50 determines whether it is setting up an auction to buy or sell power, the direct communication power monitor device 50 establishes a power consumption time frame, an amount of power and a close time for the auction at step 404. The time frame is the window within which the power will be used by the device. The close time is the time when the auction is complete. No bids are accepted for the auction after the close time.

At step 406, the direct communication power monitor device 50 establishes the minimum or maximum price for the auction. If the direct communication power monitor device 50 is establishing an auction to sell power, the direct communication power monitor device 50 sets a minimum price for the power. If the direct communication power monitor device 50 is establishing an auction to purchase power, the direct communication power monitor device 50 sets a maximum price for the power.

In a certain embodiment, the direct communication power monitor device 50 can establish an auction to purchase or sell power at the best available rate.

In a certain embodiment, the direct communication power monitor device 50 can establish an auction to purchase power to be supplied to it on a best effort basis, such that the power station will only supply power to the direct communication power monitor device 50 if the power station is not experiencing a power shortage.

At step 408, the direct communication power monitor device 50 formats the parameterized token to be sent to the power auction server 180. The direct communication power monitor device 50 specifies the type of auction, a close time for the auction, the power consumption time frame, the amount of power, and the minimum price for the power if the auction is an auction to sell power or the maximum price for the power if the auction is an auction to purchase power. Once formatted, the parameterized token is sent to the power auction server 180 where the auction is established.

The power stations 150, 160 and other direct communication power monitor devices 50 can bid for the power until the close time for the auction. No bids are accepted after the close time for the auction.

In an alternate embodiment, the direct communication power monitor device 50 does not specify a maximum price for the power in an auction to purchase power, but rather simply specifies a time frame within which the direct communication power monitor device 50 needs the power, and allows the power stations 150, 160 and other direct communication power monitor devices 50 bid to supply the power. In another alternate embodiment, the direct communication power monitor device 50 does not specify a minimum price for the power in an auction to sell power, but rather simply specifies a time frame within which the direct communication power monitor device 50 needs the power, and allows the power stations 150, 160 and other direct communication power monitor devices 50 to bid to supply the power.

In another alternate embodiment, the direct communication power monitor device 50 specifies a maximum price, a reserve price, an auction close time, and a time frame for the power auction. The maximum price acts as an initial bid for the power, but the direct communication power monitor device 50 need not purchase the power after the close of the power auction until the reserve price is met. If the reserve price is met, the direct communication power monitor device 50 must purchase the power. If the reserve price is not met, the direct communication power monitor device 50 has the option to purchase the power, but can refuse. The power stations 150, 160 and other direct communication power monitor devices 50 can bid to supply the power until the close time of the auction. No bids are accepted after the close time for the auction.

At step 410, the auction closes. Once the close time passes, no bids are accepted. After the close time has passed, the power auction server 180 determines whether there are any acceptable bids and informs the direct communication power monitor device 50 at step 412. An acceptable bid for an auction to purchase power is a bid to supply the requested power for a price which is lower than or equal to the maximum price, and an acceptable bid for an auction to sell power is a bid to purchase the requested power for a price which is greater than or equal to the minimum price. If there was an acceptable bid, the process 400 advances to step 415. If there were no acceptable bids, the process 400 advances to step 414.

In an alternate embodiment, the direct communication power monitor device 50 will be able to accept input to choose to accept bids which are greater than the maximum price in auctions to purchase power or less than the minimum price in auction to sell power. In another alternate embodiment, bids will be accepted outside the power consumption time frame.

At step 414, the direct communication power monitor device 50 is given the opportunity to set up another auction. If the direct communication power monitor device 50 wants to set up another auction, the process 400 advances to step 402. If the direct communication power monitor device 50 does not want to set up another auction, the process 400 exits.

At step 415, the direct communication power monitor device 50 determines whether the auction was an auction to sell power or an auction to purchase power. If the auction was an auction to purchase power, the process 400 advances to step 416. If the auction was an auction to sell power, the process 400 advances to step 420. In an auction to purchase power, power itself is not purchased. A token that outlines conditions under which power may be consumed by a device at a preferable rate is purchased. Conversely, in an auction to sell power, power itself is not sold. A token that outlines conditions under which power may be consumed by a device at a preferable rate is sold back to the power auction server 180.

At step 416, the direct communication power monitor device 50 sets the conditions to run the device or devices that consume the power purchased in the power auction. The direct communication power monitor device 50 receives a parameterized token setting the conditions for power consumption in accordance with the power auction and stores the information contained in the parameterized token in the data storage device 206. If the device includes the indirect communication power monitor device 60, the direct communication power monitor device 50 formats a parameterized token, and the associated one of the power monitor, signaling and switching devices 208, 210, 212 of the direct communication power monitor device 50 send the parameterized token to the indirect communication power monitor device 60 through the associated one of the group of device power ports 220, 222, 224 informing the indirect communication power monitor device 60 of the conditions of the auction. The device associated with the indirect communication power monitor device 60 runs according to the conditions established by the parameterized token. If the device does not include the indirect communication power monitor device 60, the device should be set to the "run when power available" setting. When the device is set to the "run when power available" setting, the device will run if the intelligent electrical outlet 112 that provides the device with power is turned on. At the time specified by the winning bid in the power auction, the intelligent electrical outlet 112 will be turned on by the direct communication power monitor device 50. After the time frame ends, the intelligent electrical outlet 112 is turned off by the direct communication power monitor device 50. If the device is associated with the direct communication power monitor device 50, the direct communication power monitor device 50 causes the device to run during the appropriate time frame. After the time frame comes to a close, the direct communication power monitor device 50 sends a power profile to the power auction server 180. The power profile contains the amount of power consumed by the associated device over each discrete period of time (i.e. sampling period). Alternatively, the power profile can include the amount of energy consumed during the time frame.

In a certain embodiment, the direct communication power monitor device 50 may transmit a token informing a second indirect communication power monitor device 60 of the conditions of the auction through a first indirect communication power monitor device 60, such that the direct communication power monitor device 50 transmits a parameterized token to the first indirect communication power monitor device 60, which is associated with the second indirect communication power monitor device 60, and the first indirect communication power monitor device 60 transmits the parameterized token to the second indirect communication power monitor device 60.

At step 420, the direct communication power monitor device 50 accepts the bid made by a power station or direct communication power monitor device 50 in the power auction. In an auction to sell power, power itself is not purchased. A token that outlines conditions under which power may be consumed by a device at a preferable rate is sold back to the power auction server 180. The direct communication power monitor device 50 updates the information pertaining to the token in its memory and sends an updated parameterized token to the power station 150, 160. Once the direct communication power monitor device 50 accepts the bid, the process 400 exits.

In an alternate embodiment, the direct communication power monitor device 50 can participate in many auctions at the same time.

Figure 5:
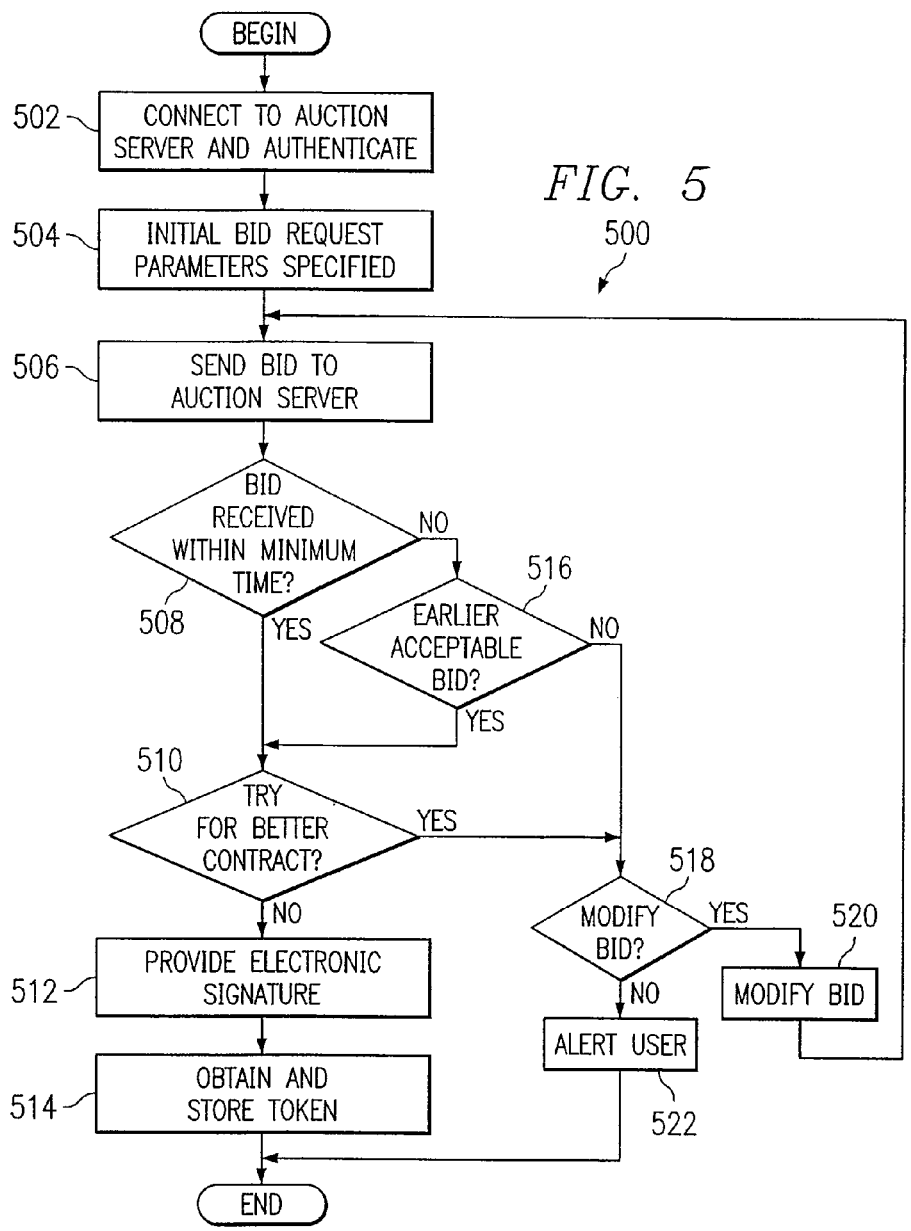
FIG. 5 is a flow chart illustrating a process of conducting a power auction in accordance with the present invention.

FIG. 5 illustrates a process 500 for bidding on power auctions. The direct communication power monitor device 50 begins the process 500 by connecting with the power auction server 180 at step 502. The direct communication power monitor device 50 sends an encrypted token to the power auction server 180 containing its digital signature. The digital signature of the direct communication power monitor device 50 uniquely identifies the direct communication power monitor device 50 to the power auction server 180. Before the token is sent, the direct communication power monitor device 50 encrypts the token using public-private encryption techniques. Upon receipt of the encrypted token, the power auction server 180 decrypts the token using public-private encryption techniques. The power auction server 180 authenticates the direct communication power monitor device 50 by using its digital signature contained within the decrypted token. Once the direct communication power monitor device 50 is authenticated, the process 500 advances to step 504.

At step 504 the direct communication power monitor device 50 specifies the initial bid parameters for the power auction. The direct communication power monitor device 50 may specify a maximum price for the power if the auction is an auction to purchase power, a minimum price for the power if the auction is an auction to sell power, the time frame within which the power will be consumed, the amount of power to be purchased or sold, and the close time for the bid. Once the relevant parameters are specified, the process 500 advances to step 506.

At step 506, the direct communication power monitor device 50 formats the specified parameters into a parameterized token and sends the token to the power auction server 180. Once received by the power auction server 180, the power auction server 180 uses the parameters contained within the parameterized token to establish the constraints for an auction. Once the parameterized token is sent to the power auction server 180, the process 500 advances to step 508.

In an alternate embodiment, the power stations 150, 160 can establish an auction to sell power at a particular preferable rate during a particular time. In another alternate embodiment, the power auction server 180 is eliminated, and the direct communication power monitor device 50 sends the parameterized token directly to the power stations 150, 160.

At step 508, the direct communication power monitor device 50 waits for the close time for the auction to elapse. If the direct communication power monitor device 50 receives a bid before the close time for the auction, the process 500 advances to step 510. If the direct communication power monitor device 50 does not receive a bid before the close time for the auction, the process 500 advances to step 516.

At step 510, the direct communication power monitor device 50 determines whether a better contract should be negotiated through an additional auction. If the direct communication power monitor device 50 determines that an additional auction should be conducted, the process 500 advances to step 518. If the direct communication power monitor device 50 determines that no additional auction should be conducted, the process 500 advances to step 512.

At step 512, the direct communication power monitor device 50 obtains and stores a token specifying the terms agreed upon during the power auction. The direct communication power monitor device 50 sends an encrypted token to the power auction server 180 including its digital signature and a message to the power auction server 180 informing the power auction server 180 that the direct communication power monitor device 50 accepts the bid that was already submitted. Once the direct communication power monitor device 50 sends the token, the process 500 advances to step 514.

At step 514, the direct communication power monitor device 50 waits for the power auction server 180 to transmit one or more tokens specifying the terms governing the power consumption agreed upon by the power auction. Once the direct communication power monitor device 50 receives the token(s) from the power auction server 180, the direct communication power monitor device 50 stores the information including start time, end time, and amount of power, in the data storage device 206 of the direct communication power monitor device 50 and establishes a trigger time based on the information contained within the token. The trigger time alerts the direct communication power monitor device 50 when an action should take place. For example, if the token is received by the direct power monitor device 50 included within the device 14, and specifies that power can be used between the times of 1:00 PM and 2:00 PM on June 12, the direct communication power monitor device 50 establishes a first trigger time at 1:00 PM on June 12, and a second trigger time at 2:00 PM on June 12. If a token is being sold back to the power auction server 180, the trigger established in relation to the token being sold back to the power auction server 180 must be altered accordingly. After the direct communication power monitor device 50 stores the contents of the token, the process 500 ends.

At step 516, having failed to receive a bid on the most recent auction within the allotted time, the direct communication power monitor device 50 determines if an acceptable bid was negotiated in a prior auction. If an acceptable bid was negotiated in a prior auction, the process 500 advances to step 510. At step 510, if an earlier acceptable bid was received but no response was received in the most recent auction, a modified bid between the acceptable bid and the bid receiving no response can be sent to auction in steps 518 and 520. Otherwise the earlier acceptable bid is used and the process continues at step 512. If no acceptable bid was negotiated in a prior auction, the process 500 advances directly to step 518.

At step 518, the direct communication power monitor device 50 determines whether the parameters defining the auction should be modified. If the direct communication power monitor device 50 determines that the parameters defining the auction should be modified, the process 500 advances to step 520. If the direct communication power monitor device 50 determines that the parameters defining the auction should not be modified, the process 500 advances to step 522. At step 522, the direct communication power monitor device 50 alerts the user of the system that no power could be purchased or sold with the parameters specified.

At step 520, the direct communication power monitor device 50 modifies the parameter describing the auction. The price, time frame, amount of power, or any other parameter describing the auction could be altered to obtain a contract or a better contract. After the parameters are specified, the process 500 advances to step 506.

In an alternate embodiment, the direct communication power monitor device 50 can participate in many auctions at the same time.

Figure 6A:
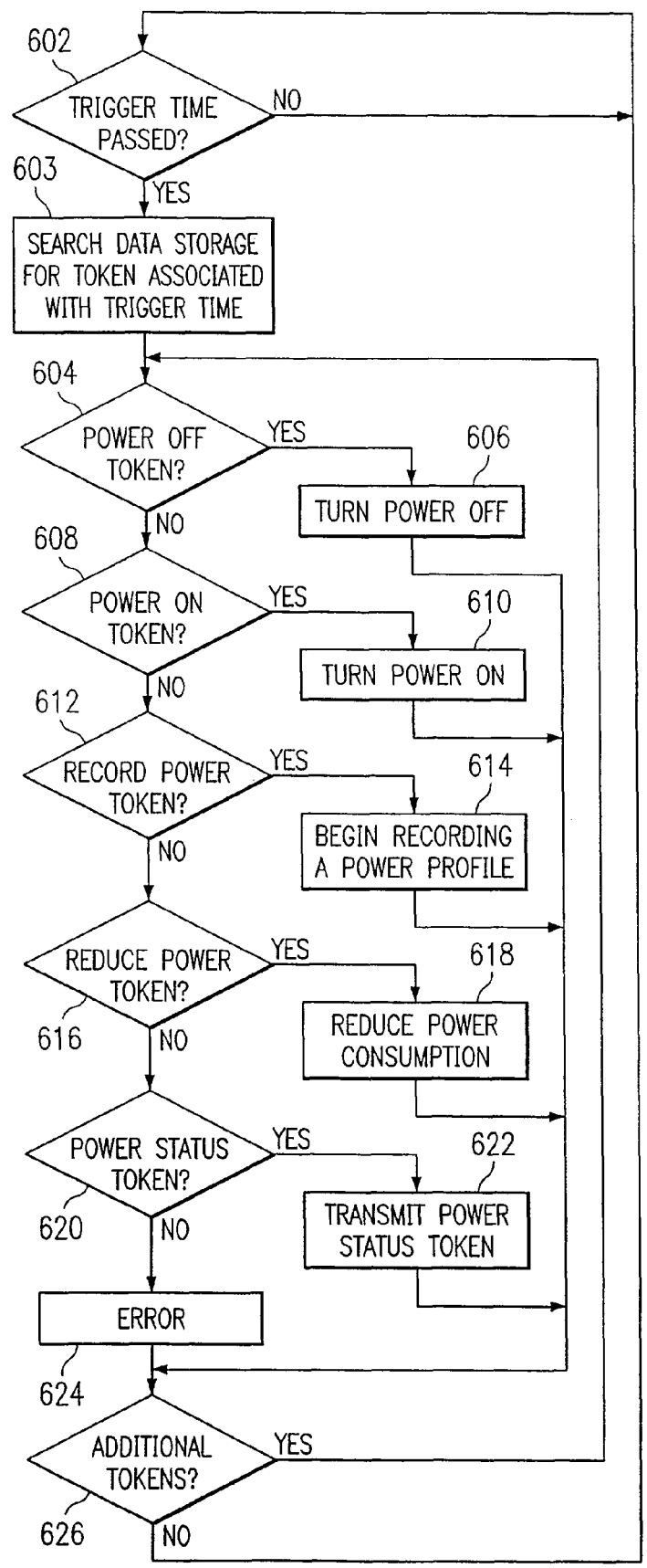
FIG. 6A is a flow chart illustrating a process of acting on tokens stored by a direct communication power monitor device 50 in accordance with the present invention.

FIG. 6A illustrates a process 600 of acting on tokens stored by a direct communication power monitor device 50. The process 600 begins at step 602. If the direct communication power monitor device 50 detects that a trigger time elapses, the process 600 advances to step 603. If no trigger time passes, the process 600 remains at step 602.

At step 603, the direct communication power monitor device 50 obtains the tokens associated with the trigger time from the data storage device 206. The direct communication power monitor device 50 removes each token associated with the trigger time from the data storage device 206 and adds it to a triggered token list. After the direct communication power monitor device 50 completes searching the data storage device 206, the process 600 advances to step 604.

At step 604, the direct communication power monitor device 50 determines whether the first token stored in the triggered token list is a power off token. If the first token in the triggered token list is a power off token, the process 600 advances to step 606. If the first token in the triggering token list is not a power off token, the process 600 advances to step 608.

At step 606, the direct communication power monitor device 50 transmits the power off token to an appropriate device depending on the destination device of the power off token. The direct communication power monitor device 50 transmits an appropriate message to an appropriate device or takes an appropriate action depending on the destination device of the power off token. If the appropriate device is configured to receive tokens, such as an indirect communication power monitor device 60, a direct communication power monitor device 50, an intelligent electrical outlet 112, or the like, the direct communication power monitor device 50 transmits a power off token to the appropriate device. The power off token is transmitted through an appropriate one of the group of power monitor, signaling and switching devices 208, 210, 212, and an appropriate one of the device power ports 220, 222, 224, to the appropriate device. If the appropriate device is not configured to receive tokens, upon receipt of the power off token the direct communication power monitor device 50 discontinues providing the destination device of the power off token with power. After the direct communication power monitor device 50 transmits the appropriate message, the first token stored in the triggered token list is removed from the triggered token list, and the process 600 advances to step 626.

In a certain embodiment, if the appropriate device is not configured to receive tokens, upon receipt of the power off token the direct communication power monitor device 50 stops recording the power supplied to the destination device of the power off token in the power profile.

At step 608, the direct communication power monitor device 50 determines whether the first token stored in the triggered token list is a power on token. If the first token in the triggered token list is a power on token, the process 600 advances to step 610. If the first token in the triggering token list is not a power on token, the process 600 advances to step 612.

At step 610, the direct communication power monitor device 50 transmits the power on token to an appropriate device depending on the destination device of the power on token. The direct communication power monitor device 50 transmits an appropriate message to the appropriate device or takes an appropriate action depending on the destination device of the power on token. If the appropriate device is configured to receive tokens, such as an indirect communication power monitor device 60, a direct communication power monitor device 50, an intelligent electrical outlet 112, or the like, the direct communication power monitor device 50 transmits a power on token to the appropriate device. The power on token is transmitted through an appropriate one of the group of power monitor, signaling and switching devices 208, 210, 212, and an appropriate one of the device power ports 220, 222, 224, to the appropriate device. The direct communication power monitor device 50 begins providing the destination device of the power on token with power. After the direct communication power monitor device 50 transmits the appropriate message, the first token stored in the triggered token list is removed from the triggered token list, and the process 600 advances to step 626.

At step 612, the direct communication power monitor device 50 determines whether the first token stored in the triggered token list is a record power token. If the first token in the triggered token list is a record power token, the process 600 advances to step 614. If the first token in the triggered token list is not a record power token, the process 600 advances to step 616.

At step 614, the direct communication power monitor device 50 transmits the record profile token to an appropriate device depending on the destination device of the record profile token. The direct communication power monitor device 50 transmits an appropriate message to the appropriate device or takes an appropriate action depending on the destination device of the record profile token. If the appropriate device is an indirect communication power monitor device 60 or a direct communication power monitor device 50, the direct communication power monitor device 50 transmits a record power token to the appropriate device. The record profile token is transmitted through an appropriate one of the group of power monitor, signaling and switching devices 208, 210, 212, and an appropriate one of the device power ports 220, 222, 224, to the appropriate device. Otherwise the direct communication power monitor device 50 begins recording a power profile in the appropriate one of the group of power monitor, signaling and switching devices 208, 210, 212 of the direct communication power monitor device 50 for the destination device of the record profile token. After the direct communication power monitor device 50 transmits the appropriate message, the first token stored in the triggered token list is removed from the triggered token list, and the process 600 advances to step 626.

In a certain embodiment, the direct communication power monitor device 50 begins recording a power profile upon receipt of a record power token.

At step 616, the direct communication power monitor device 50 determines whether the first token stored in the triggered token list is a reduce power token. If the first token in the triggered token list is a reduce power token, the process 600 advances to step 618. If the first token in the triggering token list is not a reduce power token, the process 600 advances to step 620.

At step 618, the direct communication power monitor device 50 transmits the reduce power token to an appropriate device depending on the destination device of the reduce power token. Reduced power tokens are discussed below with reference to FIG. 8. The direct communication power monitor device 50 transmits an appropriate message to the appropriate device or takes an appropriate action depending on the destination device of the reduce power token. If the appropriate device is an indirect communication power monitor device 60 or a direct communication power monitor device 50, the direct communication power monitor device 50 transmits a reduce power token to the appropriate device indicating the amount of power consumption that must be reduced. The reduce power token is transmitted through an appropriate one of the group of power monitor, signaling and switching devices 208, 210, 212, and an appropriate one of the device power ports 220, 222, 224, to the appropriate device. If the appropriate device is the intelligent electrical outlet 112, the direct communication power monitor device 50 issues a power off token if the power being used by the device attached to the intelligent electrical outlet 112 must be discontinued to satisfy the reduce power token. The power off token is transmitted through an appropriate one of the group of power monitor, signaling and switching devices 208, 210, 212, and an appropriate one of the device power ports 220, 222, 224, to the appropriate device. Otherwise, the direct communication power monitor device 50 discontinues providing power to any device, appliance or the like, if the power being used by the device, appliance or the like must be discontinued to satisfy the reduce power token. After the direct communication power monitor device 50 transmits the appropriate message, the first token stored in the triggered token list is removed from the triggered token list, and the process 600 advances to step 626.

At step 620, the direct communication power monitor device 50 determines whether the first token stored in the triggered token list is a power status token. If the first token in the triggered token list is a power status token, the process 600 advances to step 622. If the first token in the triggering token list is not a power status token, the process 600 advances to step 624.

At step 622, the direct communication power monitor device 50 transmits the power status token to an appropriate device depending on the destination device of the power status token. The direct communication power monitor device 50 transmits an appropriate message to the appropriate device or takes an appropriate action depending on the destination device of the power status token. If the appropriate device is an indirect communication power monitor device 60 or a direct communication power monitor device 50, the direct communication power monitor device 50 transmits a power status token to the appropriate device. The power status token is transmitted through an appropriate one of the group of power monitor, signaling and switching devices 208, 210, 212, and an appropriate one of the device power ports 220, 222, 224, to the appropriate device. Otherwise, the direct communication power monitor device 50 transmits the power profile associated with the destination device of the power status token to the power auction server 180. After the direct communication power monitor device 50 transmits the appropriate message, the first token stored in the triggered token list is removed from the triggered token list, and the process 600 advances to step 626.

At step 624, the direct communication power monitor device 50 reports an error message. Once the direct communication power monitor device 50 reports the error, the process 600 advances to step 626.

At step 626, the direct communication power monitor device 50 determines if there are any tokens remaining in the triggered token list. If any tokens remain in the triggered token list, the process 600 advances to step 604. If no tokens remain in the triggered token list, the process 600 advances to step 602.

In an alternate embodiment, the record power token can be eliminated, and the power on token can include the functionality of the record power token. For example, if a power on token stored by the direct communication power monitor device 50 of the device 14 is triggered, the direct communication power monitor device 50 of the device 14 can send a power on token to a controller of the device 14 causing it to begin operating, and the direct communication power monitor device 50 of the device 14 can begin recording a power profile for the device 14.

In another alternate embodiment, the power status token can be eliminated, and the power off token can include the functionality of the power status token. For example, if a power off token stored by the direct communication power monitor device 50 of the device 14 is triggered, the direct communication power monitor device 50 of the device 14 can send a power off token to a controller of the device 14 causing it to cease operation, and the direct communication power monitor device 50 of the device 14 can send the power profile for the device 14 if it has been recording one.

In a certain embodiment, additional device specific tokens may be used.

Figure 6B:
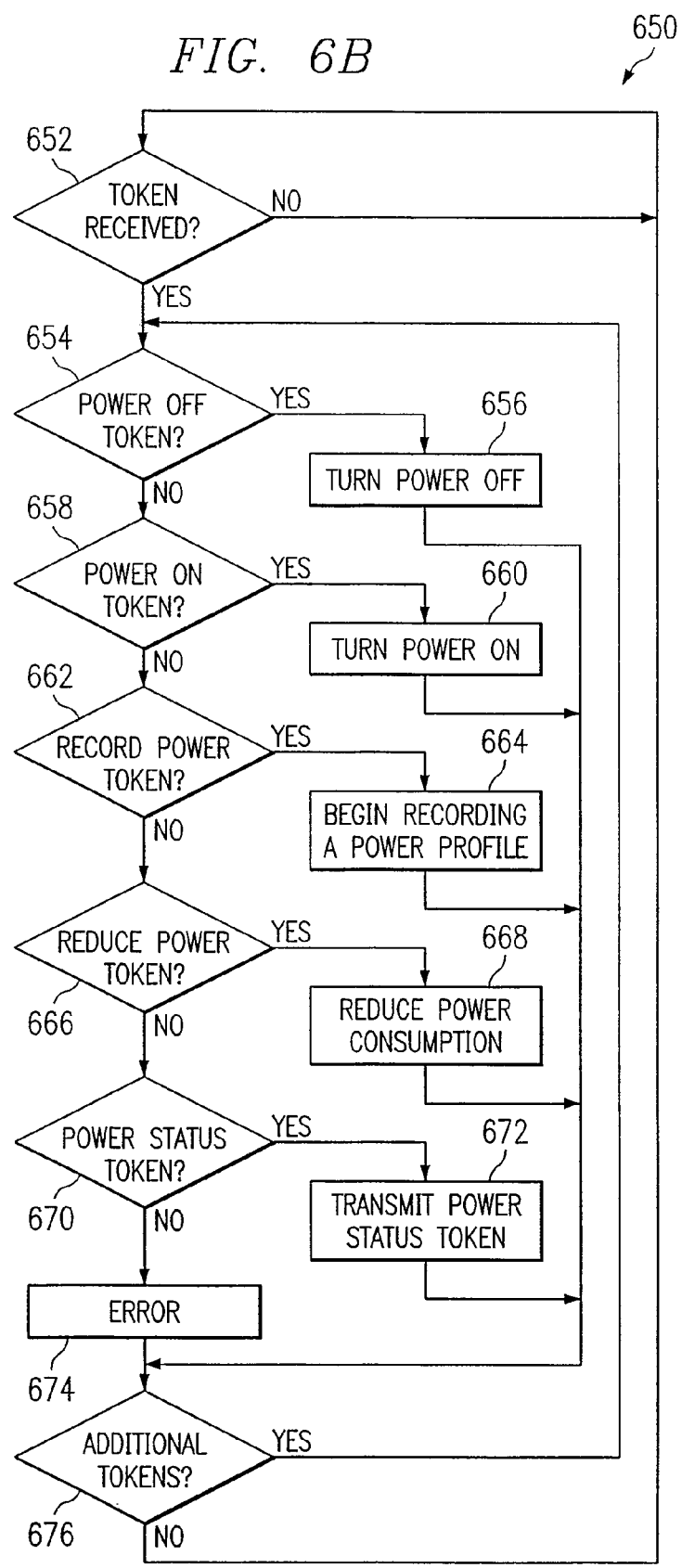
FIG. 6B is a flow chart illustrating a process of acting on tokens received by an indirect communication power monitor device 60 in accordance with the present invention.

FIG. 6B illustrates a process 650 of acting on tokens received by an indirect communication power monitor device 60. The process 650 begins at step 652. If the indirect communication power monitor device 60 receives a token, the process 650 advances to step 654. Otherwise, the process 650 remains at step 652.

At step 654, the indirect communication power monitor device 60 determines whether the first token stored in the triggered token list is a power off token. If the first token in the triggered token list is a power off token, the process 650 advances to step 656. If the first token in the triggering token list is not a power off token, the process 650 advances to step 658.

At step 656, the indirect communication power monitor device 60 transmits the power off token to an appropriate device depending on the destination device of the power off token. The indirect communication power monitor device 60 transmits an appropriate message to the appropriate device or takes an appropriate action depending on the destination device of the power off token. If the appropriate device is configured to receive tokens, such as an indirect communication power monitor device 60, a direct communication power monitor device 50, an intelligent electrical outlet 112, or the like, the indirect communication power monitor device 60 transmits a power off token to the appropriate device through the power monitor, signaling and switching device 258 and the device power port 270 to the appropriate device. If the appropriate device is not configured to receive tokens, the indirect communication power monitor device 60 discontinues providing the destination device of the power off token with power. After the indirect communication power monitor device 60 transmits the appropriate message, the first token stored in the triggered token list is removed from the triggered token list, and the process 650 advances to step 676.

At step 658, the indirect communication power monitor device 60 determines whether the first token stored in the triggered token list is a power on token. If the first token in the triggered token list is a power on token, the process 650 advances to step 660. If the first token in the triggering token list is not a power on token, the process 650 advances to step 652.

At step 660, the indirect communication power monitor device 60 transmits the power on token to an appropriate device depending on the destination device of the power on token. The indirect communication power monitor device 60 transmits an appropriate message to the appropriate device or takes an appropriate action depending on the destination device of the power on token. If the appropriate device is configured to receive tokens, such as an indirect communication power monitor device 60, a direct communication power monitor device 50, an intelligent electrical outlet 112, or the like, the indirect communication power monitor device 60 transmits a power on token to the appropriate device through the power monitor, signaling and switching device 258 and the device power port 270 to the appropriate device. The indirect communication power monitor device 60 begins providing the destination device of the power on token with power. After the indirect communication power monitor device 60 transmits the appropriate message, the first token stored in the triggered token list is removed from the triggered token list, and the process 650 advances to step 676.

At step 662, the indirect communication power monitor device 60 determines whether the first token stored in the triggered token list is a record power token. If the first token in the triggered token list is a record power token, the process

650 advances to step 664. If the first token in the triggered token list is not a record power token, the process 650 advances to step 666.

At step 664, the indirect communication power monitor device 60 transmits the record profile token to an appropriate device depending on the destination device of the record profile token. The indirect communication power monitor device 60 transmits an appropriate message to the appropriate device or takes an appropriate action depending on the destination device of the record profile token. If the appropriate device is an indirect communication power monitor device 60 or a direct communication power monitor device 50, the indirect communication power monitor device 60 transmits a record power token to the appropriate device through the power monitor, signaling and switching device 258 and the device power port 270 to the appropriate device. Otherwise the indirect communication power monitor device 60 begins recording a power profile in the power monitor, signaling and switching devices 258 of the indirect communication power monitor device 60 for the destination device of the record profile token. After the indirect communication power monitor device 60 transmits the appropriate message, the first token stored in the triggered token list is removed from the triggered token list, and the process 650 advances to step 676.

In a certain embodiment, the direct communication power monitor device 60 begins recording a power profile upon receipt of a record power token.

At step 666, the indirect communication power monitor device 60 determines whether the first token stored in the triggered token list is a reduce power token. If the first token in the triggered token list is a reduce power token, the process 600 advances to step 668. If the first token in the triggering token list is not a reduce power token, the process 600 advances to step 670.

At step 668, the indirect communication power monitor device 60 transmits the reduce power token to an appropriate device depending on the destination device of the reduce power token. Reduced power tokens are discussed below with reference to FIG. 8. The indirect communication power monitor device 60 transmits an appropriate message to the appropriate device or takes an appropriate action depending on the destination device of the reduce power token. If the appropriate device is an indirect communication power monitor device 60 or a direct communication power monitor device 50, the indirect communication power monitor device 60 transmits a reduce power token to the appropriate device through the power monitor, signaling and switching device 258 and the device power port 270 to the appropriate device indicating the amount of power consumption that must be reduced. If the appropriate device is the intelligent electrical outlet 112, the indirect communication power monitor device 60 transmits a power off token if the power being used by the device attached to the intelligent electrical outlet 112 must be discontinued to satisfy the reduce power token. Otherwise, the indirect communication power monitor device 60 discontinues providing power to any device, appliance or the like, if the power being used by the device, appliance or the like must be discontinued according to satisfy the reduce power token. After the indirect communication power monitor device 60 transmits the appropriate message, the first token stored in the triggered token list is removed from the triggered token list, and the process 650 advances to step 676.

At step 670, the indirect communication power monitor device 60 determines whether the first token stored in the triggered token list is a power status token. If the first token in the triggered token list is a power status token, the process 650 advances to step 672. If the first token in the triggering token list is not a power status token, the process 650 advances to step 674.

At step 672, the indirect communication power monitor device 60 transmits the power status token to an appropriate device depending on the destination device of the power status token. The indirect communication power monitor device 60 transmits an appropriate message or takes an appropriate action depending on the destination device of the power status token. If the appropriate device is an indirect communication power monitor device 60 or a direct communication power monitor device 50, the indirect communication power monitor device 60 transmits a power status token to the appropriate device through the power monitor, signaling and switching device 258 and the device power port 270 to the appropriate device. Otherwise, the indirect communication power monitor device 60 transmits the power profile associated with the destination device of the power status token to the associated direct communication power monitor device 50 through the power supply port 264 of the indirect communication power monitor device 60. After the indirect communication power monitor device 60 transmits the appropriate message, the first token stored in the triggered token list is removed from the triggered token list, and the process 650 advances to step 676.

At step 674, the indirect communication power monitor device 60 reports an error message. Once the indirect communication power monitor device 60 reports the error, the process 650 advances to step 676.

At step 676, the indirect communication power monitor device 60 determines if there are any tokens remaining in the triggered token list. If any tokens remain in the triggered token list, the process 650 advances to step 654. If no tokens remain in the triggered token list, the process 650 advances to step 652.

In an alternate embodiment, the record power token can be eliminated, and the power on token can include the functionality of the record power token. For example, if a power on token stored by the indirect communication power monitor device 60 of the device 14 is triggered, the indirect communication power monitor device 60 of the device 14 can send a power on token to a controller of the device 14 causing it to begin operating, and the indirect communication power monitor device 60 of the device 14 can begin recording a power profile for the device 14.

In another alternate embodiment, the power status token can be eliminated, and the power off token can include the functionality of the power status token. For example, if a power off token stored by the indirect communication power monitor device 60 of the device 14 is triggered, the indirect communication power monitor device 60 of the device 14 can send a power off token to a controller of the device 14 causing it to cease operation, and the indirect communication power monitor device 60 of the device 14 can send the power profile for the device 14 if it has been recording one.

Figure 7A:
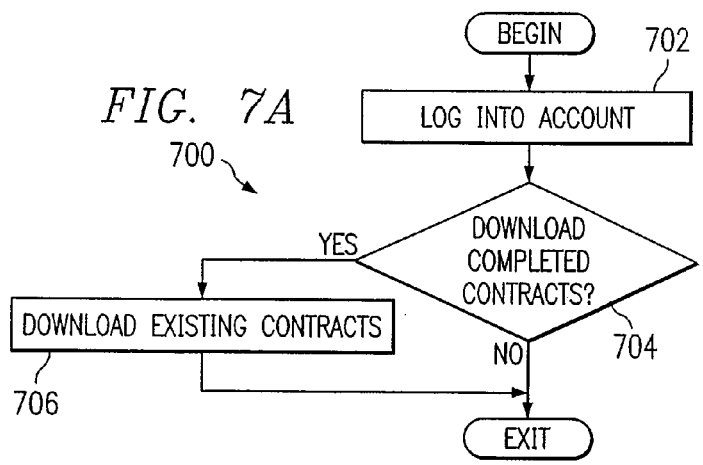
FIG. 7A is a flow chart illustrating a process for retrieving information pertaining to completed contracts in accordance with the present invention.

FIG. 7A illustrates a process 700 for retrieving information pertaining to completed contracts. The power stations 150, 160 or other direct communication power monitor devices 50 begin the process 700 by logging into the power auction server 180 at step 702. Once the power station 150, 160 or the direct communication power monitor device 50 is logged into the power auction server 180, the process 700 advances to step 704.

At step 704, the power station 150, 160 or the direct communication power monitor device 50 chooses whether or not to download from the power auction server 180 completed contracts from the successful execution of prior auctions of the power station 150, 160 or the direct communication power monitor device 50. If the power station 150, 160 or the direct communication power monitor device 50 does not want to download any contracts, the process 700 exits. If the power station 150, 160 or the direct communication power monitor device 50 wants to download existing contracts, the process 700 advances to step 706.

At step 706, the power station 150, 160 or the direct communication power monitor device 50 downloads completed contracts stored in the data storage element 184 on the power auction server 180. The power auction server 180 downloads the completed contracts, each of which can include a power profile, to a specified location. The completed contracts can be used to verify that the devices 14, 16, 18, 32, 34, 36, 104, 106, 108 associated with the direct communication power monitor devices 50 or the indirect communication power monitor devices 60 used power in compliance with the agreed upon terms of the auction. Only power that was used in compliance with the agreed upon terms of the auction is eligible for the preferential rate negotiated by the auction. Once the completed contracts are downloaded, the process 700 exits.

FIG. 7B illustrates a process 750 for bidding on power auctions. The power stations 150, 160 or other direct communication power monitor devices 50 begin the process 750 by logging into the power auction server 180 at step 752. Once the power station 150, 160 or the direct communication power monitor device 50 is logged into the power auction server 180, the process 750 advances to step 754.

At step 754, the power station 150, 160 or the direct communication power monitor device 50 can review the auctions currently stored in the data storage 184 of the power auction server 180. Each auction will display the current bid, the amount of power desired and the time frame within which the power is desired. If there is an auction that the power station 150, 160 or the direct communication power monitor device 50 wants to bid on, the power station 150, 160 or the direct communication power monitor device 50 selects that auction and the process 750 advances to step 756. If there are no auctions that the power station 150, 160 or the direct communication power monitor device 50 wants to bid on, the process 750 advances to step 760.

At step 756, the power station 150, 160 or the direct communication power monitor device 50 places a bid on the selected auction. The power station 150, 160 or the direct communication power monitor device 50 indicates a price for the power and a transaction time frame, i.e. the time frame within which the power station 150, 160 or the direct communication power monitor device 50 is willing to purchase or sell the power and which is also within the time frame specified in the auction. After the transaction time frame and amount are entered, the power station 150, 160 or the direct communication power monitor device 50 places the bid. As part of the bidding process, the current bid is updated on the auction server data storage 184. The power station 150, 160 or the direct communication power monitor device 50 may specify for how long the bid will be valid. A bid may be withdrawn up to the close of the auction. After the auction is closed, the bid may not be withdrawn. Once the bid is placed, the process 750 advances to step 758.

In an alternate embodiment, the bid can be withdrawn once the auction is closed, but there is a penalty for withdrawing the bid after the close of the auction. In another embodiment, the penalty for withdrawing the bid after the close of the auction is a monetary fine.

The power station 150, 160 or the direct communication power monitor device 50 is presented with the option to bid on another auction at step 758. If the power station 150, 160 or the direct communication power monitor device 50 elects to review the auctions again, the process 750 advances to step 754. If the power station 150, 160 or the direct communication power monitor device 50 does not want to bid on any other auctions, the process 750 advances to step 760.

At step 760, the power station 150, 160 or the direct communication power monitor device 50 is given the opportunity to exit the process 750. If the power station 150, 160 or the direct communication power monitor device 50 wants to exit the process 750, the process 750 exits. If the power station 150, 160 or the direct communication power monitor device 50 does not wish to exit the process 750, the process 750 advances to step 754.

In a certain embodiment, the power auction server 180 is not involved in the bidding process. The direct communication power monitor device 50 broadcasts a parameterized token specifying the conditions for a power auction to all power consumers, and the power stations 150, 160 or other direct communication power monitor devices 50 respond if they wish to make a bid.

FIG. 8 illustrates a process 800 for reducing the amount of power consumption during a power shortage. A power station begins the process 800 by determining whether there is a power shortage at step 802. The power station analyzes a database containing all the parameterized tokens specifying the amount of power the power station has committed to supply for the time period being analyzed. If the amount of power the power station has committed to supply for the time period and the power being drawn by the power station for the time period is greater than the production capacity of the power station, a power shortage exists. If the power station determines that a power shortage exists, the process 800 advances to step 804. If the power station determines that no power shortage exists, the process 800 remains at step 802.

At step 804, the power station specifies a power auction to repurchase a token. The power station specifies a maximum price it is willing to pay for power, a time frame within which the power tokens must apply and amount of power. The power station creates a parameterized token based on the specified parameters. Once the parameterized token is created, the process 800 advances to step 805.

In a certain embodiment, the power station 150, 160 may post a request for power tokens, for a specific time, on a well known Internet web site.

At step 805, the power station transmits the parameterized token to the power auction server 180. Once the parameterized token is transmitted to the power auction server 180, the process 800 advances to step 806.

At step 806, the power station determines if any acceptable bids were placed for the power auction the power station initiated. If acceptable bids were placed on the power auction, the process 800 advances to step 808. If no acceptable bids were placed on the power auction, the process 800 advances to step 812.

At step 808, the power station completes the specific power auction. The power station pays the agreed upon price for the token or alternatively provides a credit, and the token is returned to the power station. Once the token is returned, the process 800 advances to step 810.

At step 810, the power station cancels the returned token. The power station searches its database for the token matching the token that was returned as a result of the power auction. After the power station locates the token in its database, the power station modifies the token altering its obligation to provide that amount of power during the time period. Once the token is deleted, the process 800 advances to step 802.

At step 812, the power station determines whether the parameters defining the auction should be modified. If the power station determines that the parameters defining the auction should be modified, the process 800 advances to step 816. If the power station determines that the parameters defining the auction should not be modified, the process 800 advances to step 814. At step 814, the power station alerts the power station operator that the power shortage could not be corrected and the process 800 exits.

At step 816, the power station verifies that the power shortage still exists. If it does, at step 818, the power station specifies modified parameters describing the power auction. The price, time frame, amount of power, or any other parameter describing the auction could be altered to encourage the return of additional tokens. After the parameters are specified, the process 800 advances to step 805. If the power shortage is determined at step 816 not to exist any longer, the process 800 returns to step 802.

In an alternate embodiment, the power station can participate in many auctions at the same time.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for monitoring and controlling power to at least one device comprising:
   receiving a first command at a power monitoring and control system to create a power profile of an amount of energy consumed by the at least one device beginning at a first time;
   recording an energy consumed by the at least one device in the power profile starting at the first time;
   assigning the amount of energy which may be supplied to the at least one device after the first time;
   receiving a second command to achieve a first reduced rate of power consumption that includes at least a portion of the time between the first time and a second time;
   wherein the at least one device comprises at least two devices, and further comprising selecting which of the at least two devices is to be turned off to satisfy the first reduced rate of power consumption;
   transmitting the second command to a second power monitoring and control system to turn on the at least one device at the first time and turn off the at least one device at the second time subsequent to the first time; and
   creating at the second power monitoring and control system the power profile of the amount of energy consumed by the device between the first time and the second time.

2. The method of claim 1, further comprising receiving a third command to stop recording the energy consumed by the at least one device in the power profile and to transmit the power profile.

3. The method of claim 2, wherein the third command comprises commanding transmission of the power profile to at least one of a power station, the second power monitoring and control system, a server, and a computer.

4. The method of claim 1, further comprising assigning a third time defining a start of a time frame within which power may be supplied to the at least one device.

5. The method of claim 4, further comprising assigning a fourth time defining an end of the time frame within which power may be supplied to the at least one device.

6. The method of claim 5, further comprising transmitting a message to at least one of a power station, the second power monitoring and control system, and a computer, the message comprising the third time, the fourth time and the amount of energy which may be supplied to the device in the time frame.

7. The method of claim 1, further comprising comparing the power profile to an amount of energy negotiated between the power monitoring and control system and a power supplier.

8. The method of claim 1, further comprising:
   transmitting the second command to the device to turn on at the first time; and
   transmitting a third command to the device to turn off at the second time subsequent to the first time.

9. The method of claim 1, further comprising transmitting a fourth command to turn off a selected one of the at least one device.

10. An apparatus for monitoring and controlling power to at least one device, comprising:
    a processor; and
    logic, the logic when executed by the processor operable to:
      receive a first command at a power monitoring and control system to create a power profile of an amount of energy consumed by the at least one device beginning at a first time;
      record an energy consumed by the at least one device in the power profile starting at the first time;
      assign the amount of energy which may be supplied to the at least one device after the first time;
      receive a second command to achieve a first reduced rate of power consumption that includes at least a portion of the time between the first time and a second time;
      wherein the at least one device comprises at least two devices, and further operable to select which of the at least two devices is to be turned off to satisfy the first reduced rate of power consumption;
      transmit the second command to a second power monitoring and control system to turn on the at least one device at the first time and turn off the at least one device at the second time subsequent to the first time; and
      create at the second power monitoring and control system the power profile of the amount of energy consumed by the device between the first time and the second time.

11. The apparatus of claim 10, the logic further operable to receive a third command to stop recording the energy consumed by the at least one device in the power profile and to transmit the power profile.

12. The apparatus of claim 11, wherein the third command comprises commanding transmission of the power profile to at least one of a power station, the second power monitoring and control system, a server, and a computer.

13. The apparatus of claim 10, the logic further operable to assign a third time defining a start of a time frame within which power may be supplied to the at least one device.

14. The apparatus of claim 13, the logic further operable to assign a fourth time defining an end of the time frame within which power may be supplied to the at least one device.

15. The apparatus of claim 14, the logic further operable to transmit a message to at least one of a power station, the second power monitoring and control system, and a computer, the message comprising the third time, the fourth time and the amount of energy which may be supplied to the device in the time frame.

16. The apparatus of claim 10, the logic further operable to compare the power profile to an amount of energy negotiated between the power monitoring and control system and a power supplier.

17. The apparatus of claim 10, the logic further operable to:
transmit the second command to the device to turn on at the first time; and
transmit a third command to the device to turn off at the second time subsequent to the first time.

18. The apparatus of claim 10, the logic further operable to transmit a fourth command to turn off a selected one of the at least one device.

* * * * *